United States Patent
Hirschfeld

[11] Patent Number: 5,959,268
[45] Date of Patent: Sep. 28, 1999

[54] ELECTRICAL SWITCH HAVING A PAIR OF ENGAGING ACTUATING ELEMENTS ROTATIONAL BETWEEN SWITCHING POSITIONS

[75] Inventor: Klaus Hirschfeld, Ludenscheid, Germany

[73] Assignee: Leopold Kostal GmbH & Co. KG, Ludenscheid, Germany

[21] Appl. No.: 09/037,775

[22] Filed: Mar. 10, 1998

[30] Foreign Application Priority Data

May 30, 1997 [DE] Germany ............... 197 22 611

[51] Int. Cl.⁶ ..................................... H01H 19/64
[52] U.S. Cl. ............... 200/5 B; 200/9; 200/61.54
[58] Field of Search ............. 200/5 B, 9, 50.32, 200/61.39, 61.54

[56] References Cited

U.S. PATENT DOCUMENTS

| | | |
|---|---|---|
| 5,012,056 | 4/1991 | Abel et al. . |
| 5,780,794 | 7/1998 | Uchiyama et al. ............. 200/61.54 |
| 5,859,396 | 1/1999 | Yokoyama ............. 200/61.54 |

FOREIGN PATENT DOCUMENTS 0 446 126 A1  9/1991  European Pat. Off. .

Primary Examiner—Renee S. Luebke
Attorney, Agent, or Firm—Brooks & Kushman P.C.

[57] ABSTRACT

An electrical switch is proposed which in addition to its mechanical functional parts and the electrical contact parts influenced by said mechanical functional parts consists of a housing and a first actuating element which is rotatably mounted therein and which can be moved into several switching positions and a second actuating element which is likewise rotatably mounted on the housing and can be moved into several switch settings. For the purpose of developing further an electrical switch, which comprises two rotatably adjustable actuating elements, in such a manner that, whilst maintaining a convenient and inexpensive process of assembling the individual functional parts, the blocking body merely produces slight forces which are effective only in the radial direction, a first and a second functional projection are formed as one on the first actuating element and the first functional projection can be moved to become operationally connected to a driver cam formed as one on the second actuating element and a blocking body which is subjected to the spring action and can be deflected in a radial manner can be brought into operational connection with at least one of the blocking cams formed as one on the second actuating element, wherein the blocking body performs a radially deflected movement by virtue of the second functional projection, so that the adjusting possibilities of the second actuating element are either blocked or released.

10 Claims, 3 Drawing Sheets

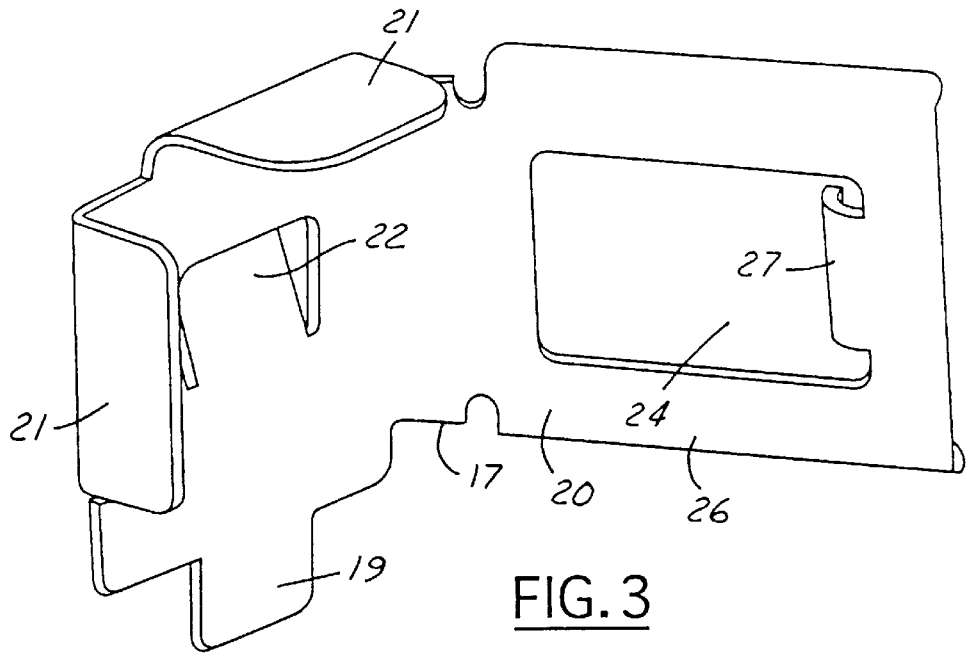
FIG. 3
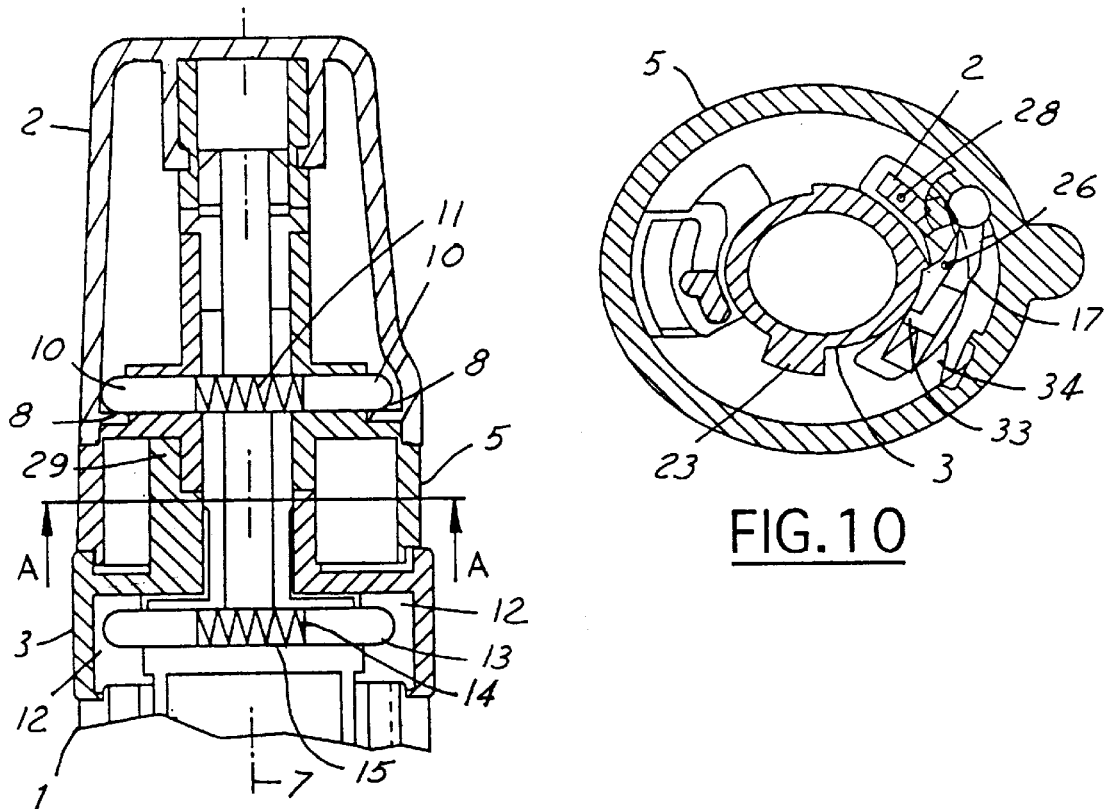
FIG. 2
FIG. 10

ELECTRICAL SWITCH HAVING A PAIR OF ENGAGING ACTUATING ELEMENTS ROTATIONAL BETWEEN SWITCHING POSITIONS

DESCRIPTION

The present invention relates to an electrical switch having rotationally displaceable actuating elements.

Electrical switches of this type are required to fulfill many functions. In other words, these switches should provide multiple adjusting possibilities in a compact installation space. It must be possible to operate the actuating elements of such switches in a convenient and definite manner. It is thus possible for the user by switching on, off and over the connected electrical circuits to influence a plurality of functions in a comfortable manner. Often, such electrical switches are used to switch the various functions of the lighting system of a motor vehicle either on or off.

An electrical switch for a control unit of a motor vehicle is known from EP 0 446 126 B1. This electrical switch is designed as a switching button of the switching lever of a steering column switch and provided for the purpose of influencing the functions of the lighting system of a motor vehicle. The switch designed as a switching button comprises two annular actuating elements which can be adjusted in each case in a rotatable movement about the housing longitudinal axis into several positions. One of the two actuating elements can be displaced independently of the position of the other actuating element but the other actuating element can only be displaced in dependence upon the position of the one actuating element. In other words, the adjusting possibilities are either blocked or released. This is the case in order effectively to prevent the switching on of inadmissible function combinations of the lighting system. Moreover, for the same reason the two actuating elements are functionally connected, i.e. the displacement of one actuating element out of certain positions automatically simultaneously displaces the other actuating element. In order to block the displacement movement or to provide the functional coupling the known electrical switch comprises a cooperating finger which is spring-loaded, is held in such a manner as to be able to rotate in the housing body and can be displaced in parallel with the housing longitudinal axis. Owing to its one-sided manner of functioning in parallel with the housing longitudinal axis, this cooperating finger does, however, produce an unfavourable dynamic effect which over the course of time can cause incorrect alignments of the actuating elements and thus adversely affect the functions of the electrical switch. Moreover, the assembly of an electrical switch designed in this manner is comparatively expensive.

Moreover, a control device for an electrical switch is known from DE 38 34 390 C1, by means of which the actuating element of the electrical switch can only be moved into admissible switching positions. This control device effectively prevents inadmissible function combinations from being switched on. The control device is provided for an electrical switch, whose actuating element can be displaced into several positions by means of a combined rotating and pulling movement or rotating and pushing movement. The electrical switch can be displaced both into several rotated and also into several pull or push positions in order to be able to influence the different functions of the lighting system of a motor vehicle. The rotated positions influence the parking light and driving light function and the pull or push positions influence the fog lamp and rear fog lamp function. In order effectively to prevent inadmissible function combinations, two control elements which are disposed offset by 180° with respect to each other and aligned radially with respect to the rotational axis engage in each case in a control connecting member provided on the housing. The design of the control connecting member with its control tracks serves to couple the functions of the two movements, so that predetermined switching position combinations are blocked or from certain switching position combinations upon the displacement of the actuating element into one of its actuating directions, a displacement in another actuating direction is also automatically performed. The symmetrical arrangement of the two spring-loaded control elements produces a favorable force which functions in the radial direction, so that any incorrect alignment of the actuating element is effectively prevented in all positions.

The object of the present invention is to develop further an electrical switch comprising two rotationally displaceable actuating elements in such a manner that whilst maintaining a convenient and inexpensive process of assembling the individual functional parts, the blocking body produces only slight forces which are effective only in the radial direction, so that over the entire serviceable life of the electrical switch, it is guaranteed that the actuating elements are aligned in a precise manner.

In the case of an electrical switch designed in this manner it is particularly advantageous that the skillful arrangement and allocation of the individual function parts ensures that the amount of wear, which inevitably occurs during the actuation of the actuating elements, is kept to a minimum. In so doing, an essential role is performed by the fact that the spring-loaded blocking body is not simultaneously displaced as the actuating elements are displaced, but rather is disposed on a fixed housing part. Moreover, an electrical switch constructed in this manner renders it possible in a convenient manner to perform changes with respect to the positioning and the number of the functional projections, blocking cams, driver cams. Thus, it is possible to achieve the different functional operations of a plurality of switching variants without great expense.

Further advantageous embodiments of the subject matter in accordance with the invention are provided in the specification.

The subject matter in accordance with the invention is further explained with reference to two exemplified embodiments illustrated in the drawings, in which:

FIG. 2 shows a longitudinal sectional view through an electrical switch,

FIG. 3 shows an enlarged view of a blocking body in the form of a leaf spring,

FIG. 10 shows a blocking body formed as a detent pawl.

As is evident from the figures, in addition to electrical contact parts which for the sake of simplicity have been omitted, such an electrical switch consists substantially of a housing 1, a first actuating element 2 which is mounted on the housing 1 and can be moved in a rotatable manner into several switching positions and a second actuating element 3 which is likewise mounted on the housing 1 and can be moved in a rotatable manner into several switch settings.

Figure 1:
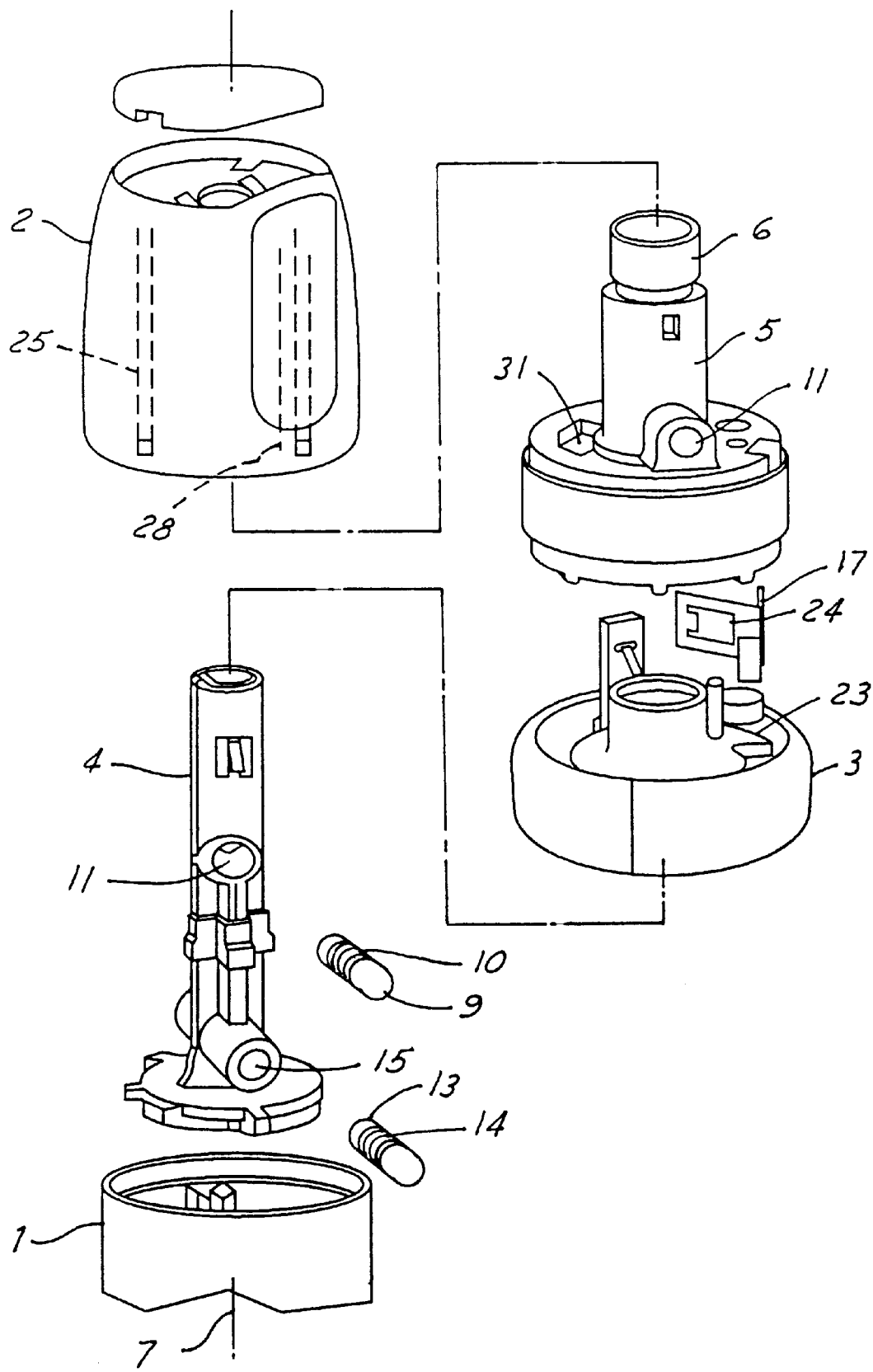
FIG. 1 shows a diagrammatic exploded view of an electrical switch.

As is particularly evident from FIG. 1 and FIG. 2, a receiving body 4 is fixedly attached to the housing 1. The receiving body 4, which as far as the function is concerned is associated with the housing 1, is designed substantially in a spigot-like manner and receives, on its lower region remote from the free end, the second actuating element 3 in a rotatably displaceable manner. The central region of the receiving body 4 is provided for the purpose of fixedly holding a separating ring 5 which is placed between the first and the second actuating element 2, 3 and as far as the function is concerned is likewise associated with the housing 1.

The separating ring 5 comprises a spigot-like projection 6 which serves as a bearing for the rotatably displaceable first actuating element 2. Various holding and guiding elements ensure that the housing 1 and the two actuating elements 2, 3 are arranged in a functionally suitable and positionally precise manner.

In order to secure the three different switching positions, two locking curves 8 are formed as one into inner face of the first actuating element 2, which inner face encompasses the housing longitudinal axis 7 in a concentric manner. The two locking curves 8 are disposed offset by 180° with respect to each other and a locking element 9 engages in each of the two locking curves 8. A helical compression spring 10 is disposed between the two locking elements 9 for the purpose of producing the locking effect. For the purpose of being displaceably received the two locking elements 9 and the helical compression spring 10 are accommodated in a receiving tunnel 11 which is provided partly in the receiving body 4 and partly in the projection 6 of the separating ring 5 and which tunnel extends transverse to the housing longitudinal axis 7. In order to secure likewise three different switch settings, two further locking curves 12 are formed as one in the inner face of the second actuating element 3, which inner face encompasses the housing longitudinal axis 7 in a concentric manner. The two further locking curves 12 are disposed offset by 180° with respect to each other and a further locking element 13 engages into each of the two further locking curves 12. A further helical compression spring 14 is disposed between the two further locking elements 13 for the purpose of producing the locking effect. For the purpose of being displaceably received the two further locking elements 13 and the further helical compression spring 14 are accommodated in a further receiving tunnel 15 which is provided in the receiving body 4 and extends transverse to the housing longitudinal axis 7. The two actuating elements 2, 3 can thus be operated in a convenient manner, wherein it is unambiguously evident to the user by virtue of the clearly noticeable locking action, that the displaced actuating element 2, 3 has assumed a defined switching position or switch setting.

A receiving pocket 16 is formed as one in the base of the separating ring 5 which is fixedly attached to the housing 1, which base is remote from the projection 6. The receiving pocket serves to fix the blocking body 17 designed as a leaf spring. Thus, the blocking body 17 can be mounted precisely in position in a particularly convenient manner.

As is especially evident from FIGS. 3 to 9, the blocking body 17 which is fixed in the receiving pocket 16 and is designed as a leaf spring comprises two limbs 19, 20. One limb 19 is provided as one piece with guiding and holding elements 21 and a locking tongue 22 and for the purpose of a positive-locking reception is merely inserted into the receiving pocket 16 and in so doing is fixed in a locking manner. The other limb 20 is bent at an angle of approx. 80° in the direction towards the housing longitudinal axis 7 out of the plane of extension of the limb 19. For the purpose of cooperating with a blocking cam 23 formed as one on the second actuating element 3, the other limb 20 comprises a detent window 24. In addition thereto, in order to be able to be operatively connected to a second functional projection 28 formed as one on the first actuating element 2, one of the detent window edges represents an actuating face 26. When operatively connected the blocking body 17 is displaced radially outwards by virtue of the second functional projection 28, whereby the blocking effect of the blocking body 17 is eliminated. In order to avoid hooking with the blocking cam 23, the detent window 24 comprises a detent bracket 27 which is curved in the direction of the outer wall of the housing 1 and is provided with a contact radius.

As is also particularly evident from FIGS. 1 and 4–9, a first functional projection 25 is additionally formed as one on the first actuating element 2. This first functional projection 25 serves to return the second actuating element 3 automatically out of its switch setting II into its switch setting 1. For this purpose, upon rotating the first actuating element 2 back out of its switching position II or switching position I into its switching position 0, the first functional projection 25 moves into operational connection simultaneously at a driver cam 29 formed as one on the second actuating element 3.

Figure 4:
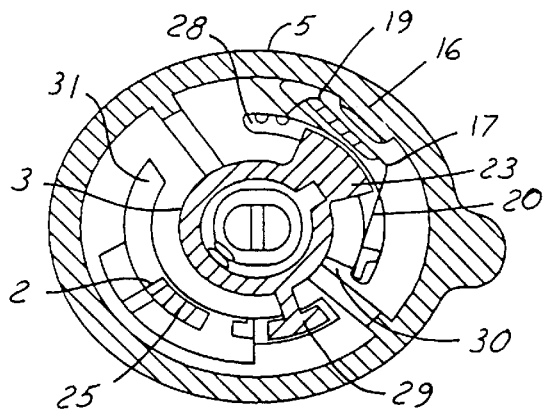
FIG. 4 illustrates a sectional view along the line A—A as shown in FIG. 2, with the first actuating element in position 0 and the second actuating element in position 0.

With reference to FIGS. 4 to 9, the different switching positions, switch settings and switching combinations of the two actuating elements 2, 3 of the electrical switch are further explained. The electrical switch can be used for example to influence various functions of the lighting system (light, fog lamp) of a motor vehicle. The illustration in FIG. 4 shows two actuating elements 2, 3 of the electrical switch in each case in their switching position 0 or switch setting 0, i.e. neither one of the light functions (parking light, driving light), nor one of the fog lamp functions (fog lamp, rear fog lamp) are in the switched-on state. The blocking body 17 is lying in this switching combination with its free end of its other limb 20 in a pre-stressed manner on a stop 30 provided on the separating ring 5. Starting at the switching combination, illustrated in FIG. 4, of the two actuating elements 2, 3, the first actuating element 2 can be moved readily into its switching position I (parking light function switched on) and its switching position II (driving light function switched on) by rotation in the clockwise direction. The same applies in the reverse for restoring the first actuating element 2 in the counter clockwise direction starting from its switching position II into the switching position 0. The switching positions are not blocked because the second functional projection 28 formed as one on the first actuating element 2 displaces the blocking body 7 radially outwards by way of its actuating face 26 against the pre-stressing. Moreover, it is particularly evident from FIGS. 4 to 9 that the first functional projection 25 is held with a limited amount of movement in an arcuate first guide track 31 and the second guide projection 28 is held with a limited amount of movement in an arcuate second guide track 32. The first and the second guide track 31, 32 are each formed as one in the base of the separating ring 5.

Figure 5:
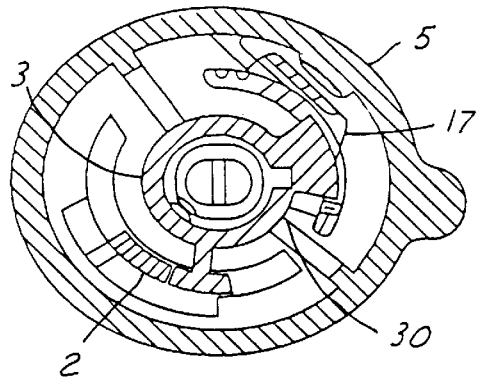
FIG. 5 illustrates a sectional view along the line A—A, with the first actuating element in position 0 and the second actuating element in position I.
Figure 6:
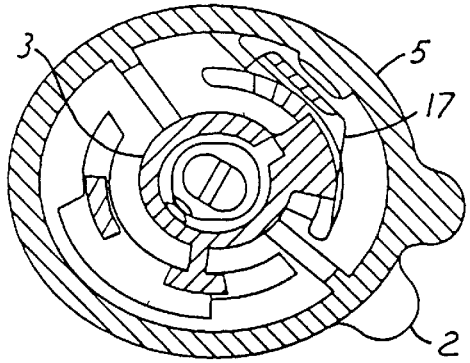
FIG. 6 illustrates a sectional view along the line A—A, with the first actuating element in position I and the second actuating element in position 0.
Figure 7:
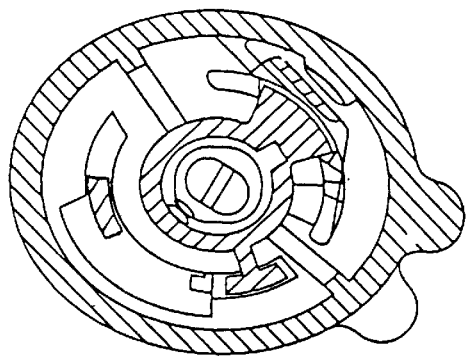
FIG. 7 illustrates a sectional view along the line A—A, with the first actuating element in position I and the second actuating element in position I.
Figure 8:
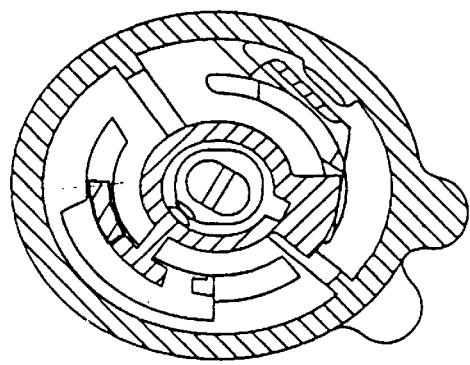
FIG. 8 illustrates a sectional view along the line A—A, with the first actuating element in position I and the second actuating element in position II.

The aforementioned functional operation of the first actuating element 2 likewise occurs if the second actuating element 3—as illustrated in FIG. 5—is located in its switch setting I. The first actuating element 2 can be moved unhindered into its various switching positions 0, I, II.

If, however, the first actuating element 2 is located in its switching position 0, then the second actuating element 3 can only be moved into its switch setting I (fog lamp is switching on) but not into its switch setting II (fog lamp and rear fog lamp are switched on), because the blocking body 17 effectively blocks the further displacement of the second actuating element 3. As is further evident, particularly in FIG. 5, in this connection, the blocking cam 23 is positioned in the detent window 24 of the blocking body 17 and comes into contact in a blocking manner at the detent bracket 27. The second actuating element 3 can therefore be returned from its switch setting I only into its switch setting 0.

Only when the first actuating element 2 has assumed its switching position I, can the second actuating element 3 be displaced into its switch setting II, because—as is particularly evident in FIGS. 6 to 9—the blocking effect of the blocking body 17 is eliminated. This is the case, because the first functional projection 25 displaces the blocking body 17 radially outwards upon the first actuating element 2 being displaced into its switching position I. If the first actuating element 2 is moved starting from its switching position 0 into the switching position I, then the first functional projection 25 comes to rest against the actuating face 26 of the other limb 20 and as a consequence displaces it, against its pre-stressing, increasingly further outwards. Thus, the second actuating element 3 is finally freely displaceable because the blocking body 17 is no longer performs a blocking action. In other words, starting from its switch setting 0 the second actuating element 3 can be readily moved into its switch setting I and II. The aforementioned functional process of the second actuating element 3 can likewise be performed, if the first actuating element 2 is located in its switching position II. In the reverse sequence, this functional operation can likewise be performed unhindered, if the second actuating element 3 is to be moved back starting from its switch setting II into its switch setting I or 0 and the first actuating element 2 is located either in its switching position I or II.

Figure 9:
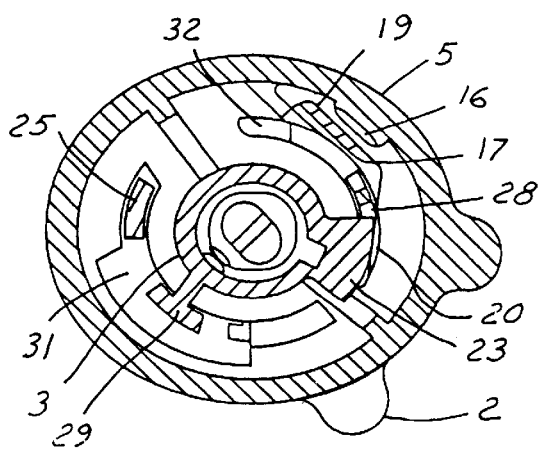
FIG. 9 illustrates a sectional view along the line A—A, with the first actuating element in position II and the second actuating element in position II.

If—as is particularly evident in FIG. 9—both the first actuating element 2 is located in its switching position II and also the second actuating element 3 is located in its switch setting II, the functions driving light, fog lamp and rear fog lamp can be switched on in combination. Starting from its switch setting II the second actuating element 3 can—as already described above—be returned readily into its switch setting I or 0. In other words, the return movement into these switch settings is neither blocked, nor is the first actuating element 2 influenced as the second actuating element 3 is returned. Also, as is particularly evident in FIG. 8, the first actuating element 2 can be readily returned into its switch setting I. If, however, the second actuating element 3 is located in its switch setting II and if then the first actuating element 2 starting from its switching position 1—as is evident from FIG. 8—is returned into its switching position 0, then the first functional projection 25 formed as one on the first actuating element 2 moves into operational connection with the driver cam 29 formed as one on the second actuating element 3. By virtue of the operational connection of the first functional projection 25 and with the driver cams 29, the second actuating element 3 can then be returned automatically into its switch setting I by virtue of returning the first actuating element 2 into its switching position 0—as is particularly evident in FIG. 5. Inadmissible switching combinations of the two actuating elements 2, 3 are thus effectively prevented in a convenient manner.

In order in the case of switching variants necessary for other functional operations, to be able to block other switching combinations or to achieve other automatic simultaneous driving effects, it is naturally possible, for example to form as one a plurality of blocking cams 23 or one blocking cam 23 on a different position on the second actuating element 3. The same can also be achieved if for example the first and/or the second functional projection 25, 28 of the first actuating element 2 and/or the driver cam 29 of the second actuating element 3 is formed as one at a different position. In a convenient manner the blocking of predetermined switching combinations or the automatic simultaneous displacement can thus be varied in order to be able to achieve a number of switching variants comprising different functional operations.

As is particularly evident from FIG. 10, the blocking body 17 is formed as a detent pawl and is pivotably mounted on the separating ring 5 which as far as the function is concerned is associated with the housing 1. The detent pawl is provided with a blocking profile 33 formed as one on its surface facing the housing longitudinal axis 7. For the purpose of blocking the actuating possibility, the blocking profile 33 moves into operational connection with a blocking cam 23 formed as one on the second actuating element 3. It is then no longer possible to actuate the second actuating element 3 in the clockwise direction. In order to eliminate the blocking effect, a second functional projection 28 formed as one on the first actuating element 2 is moved, by virtue of actuating the first actuating element 2, into operational connection with an actuating face 26 formed as one on the detent pawl. The second functional projection causes the detent pawl to pivot radially outwards against the resilient effect of a resilient element 34 formed as a helical compression spring. In order to provide a secure hold, the resilient element 34 formed as a helical compression spring is disposed between the outer face, lying opposite the blocking profile 33, of the detent pawl and the corresponding inner wall portion of the separating ring 5.

I claim:

1. An electrical switch for a control unit of a motor vehicle, the switch comprising:

a housing having a longitudinal axis;

a first actuating element mounted to the housing and rotatable about the longitudinal axis to move between switching positions, the first actuating element having first and second projections;

a second actuating element mounted to the housing and rotatable about the longitudinal axis to move between switching positions, the second actuating element having blocking and driving cams;

wherein the first projection is operable with the driving cam to move the second actuating element between a given pair of switching positions when the first actuating element is moved between a given pair of switching positions;

a blocking body mounted to the housing, the blocking body radially displaceable from an inward position to an outward position, wherein in the inward position the blocking body engages the blocking cam to prevent the second actuating element from moving, wherein the blocking body engages the second projection to be radially displaced by the second projection to the outward position and allow the second actuating element to move when the first actuating element is in a given switching position.

2. The switch of claim 1 wherein:

the housing includes an inner surface concentrically encompassing the longitudinal axis, the inner surface having first and second pairs of locking curves operable with first and second spring loaded locking elements, respectively, for securing the switching positions of the first and second actuating elements.

3. The switch of claim 1 further comprising:

a separating ring mounted to the housing and disposed between the first and second actuating elements.

4. The switch of claim 1 further comprising:

a receiving body mounted to the housing, the receiving body receiving the first and second actuating elements for rotational displacement about the longitudinal axis and receiving the separating ring to mount the separating ring to the housing.

5. The switch of claim 1 wherein:

the blocking body is a leaf spring.

6. The switch of claim 5 wherein:

the blocking body includes first and second limbs, the first limb is fixed in a receiving pocket of the housing and the second limb is bent from the first limb approximately 80°, the blocking body being a detent window having an actuating face, wherein in the inward position the detent window engages the blocking cam to prevent the second actuating element from moving, wherein the actuating face engages the second projection to radially displace the blocking body to the outward position from the inward position and allow the second actuating element to move when the first actuating element is in the given switching position.

7. The switch of claim 1 wherein:

the blocking body is a detent pawl pivotably mounted to the housing, the detent pawl having a blocking profile and an actuating face, wherein the blocking profile engages the blocking cam when the detent pawl is in the inward position, and wherein the actuating face engages the second projection to radially displace the detent pawl to the outward position and allow the second actuating element to move when the first actuating element is in the given switching position.

8. The switch of 7 wherein:

the detent pawl includes a sheet hinge mounted to the housing.

9. The switch of claim 7 wherein:

the detent pawl includes a resilient element operable with the blocking profile and the housing to provide a resilient force to the blocking profile to maintain the detent pawl in the inward position.

10. The switch of claim 9 wherein:

the resilient element is a helical compression spring.

\* \* \* \* \*